United States Patent
Galea et al.

(10) Patent No.: US 10,246,369 B2
(45) Date of Patent: Apr. 2, 2019

(54) HIGH INDEX GLASSES

(71) Applicant: Corning Incorporated, Corning, NY (US)

(72) Inventors: Jean Marc Galea, Samoreau (FR); Thierry Michel Dugue, Chevrainvilliers (FR)

(73) Assignee: CORNING INCORPORATED, Corning, NY (US)

( * ) Notice: Subject to any disclaimer, the term of this patent is extended or adjusted under 35 U.S.C. 154(b) by 251 days.

(21) Appl. No.: 15/223,840

(22) Filed: Jul. 29, 2016

(65) Prior Publication Data

US 2017/0029322 A1  Feb. 2, 2017

Related U.S. Application Data

(60) Provisional application No. 62/199,651, filed on Jul. 31, 2015.

(51) Int. Cl.
*G02B 27/01* (2006.01)
*C03C 3/112* (2006.01)

(52) U.S. Cl.
CPC ............ *C03C 3/112* (2013.01); *G02B 27/017* (2013.01); *G02B 27/0172* (2013.01); *G02B 2027/0178* (2013.01)

(58) Field of Classification Search
CPC .............. G02B 27/017; G02B 27/0172; G02B 2027/0178
See application file for complete search history.

(56) References Cited

U.S. PATENT DOCUMENTS

| | | | |
|---|---|---|---|
| 4,149,895 A | | 4/1979 | Boudot et al. |
| 5,525,554 A | * | 6/1996 | Comte .................... C03C 3/062 501/63 |
| 2010/0157400 A1 | * | 6/2010 | Dimov ................... G02B 5/188 359/13 |
| 2013/0011607 A1 | | 1/2013 | Mushiake et al. |
| 2015/0177522 A1 | | 6/2015 | Yajima et al. |

* cited by examiner

*Primary Examiner* — Joseph P Martinez

(57) ABSTRACT

A high refractive index glass is provided. The glass has a refractive index greater than or equal to 1.7 and less than about 0.1 wt. % $As_2O_3$. A head mounted wearable device having a light guide optical element including high refractive index glass is also provided.

20 Claims, 1 Drawing Sheet

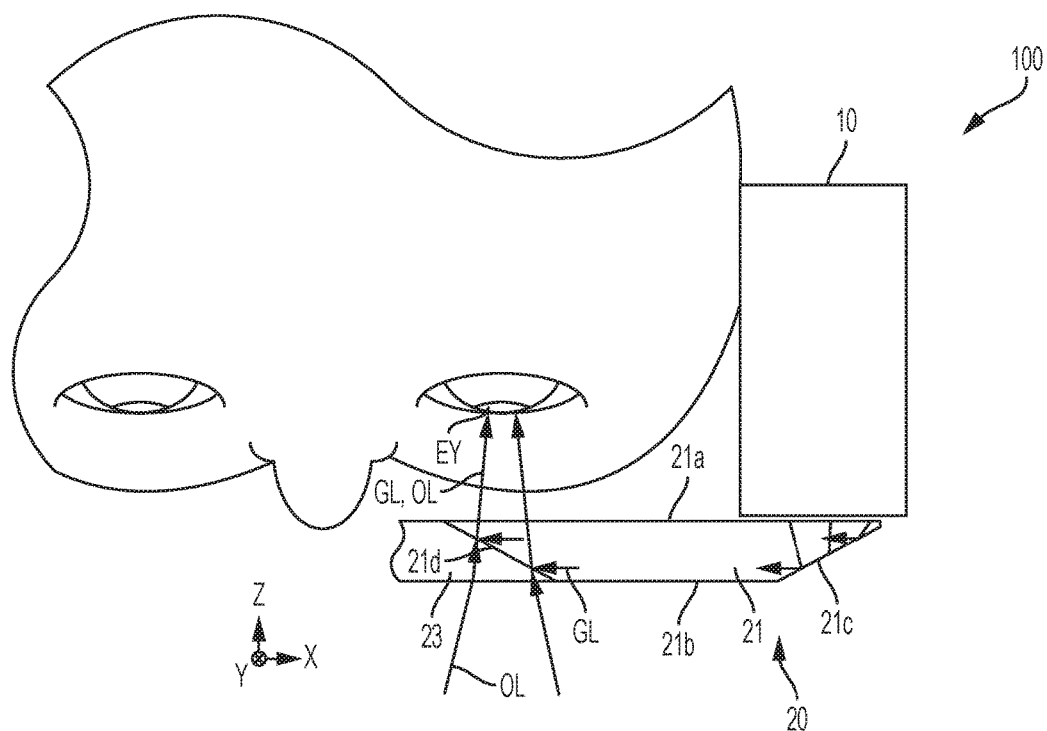

HIGH INDEX GLASSES

This application claims the benefit of priority under 35 U.S.C. § 119 of U.S. Provisional Application Ser. No. 62/199,651 filed on Jul. 31, 2015, the content of which is relied upon and incorporated herein by reference in its entirety.

FIELD

The present disclosure generally relates to glasses with high refractive index. More particularly, the present disclosure relates to glasses having a refractive index of greater than or equal to about 1.7.

BACKGROUND

Glasses of varying compositions particularly for use in optical and ophthalmic applications are known. Such glasses have, for example, a refractive index of about 1.7, an Abbe number of about 35, and a density of about 3.2. These glasses exhibit good resistance to acids and viscosities at the liquidus in excess of 22 Pa·s, which is advantageous for their production, allowing for direct molding. These properties make such glasses particularly suited for optic and ophthalmic applications. However, such glasses may have low viscosity at the liquidus temperature, low chemical durability, yellow coloration and/or may be associated with high batch costs.

Furthermore, these glasses are often formed using manufacturing processes that employ arsenic ($As_2O_3$) as a fining agent. $As_2O_3$ is a very effective high temperature fining agent which allows for $O_2$ release from a glass melt at high melting temperatures and minimizes the creation of compositional inhomogeneities and gaseous inclusions in the glass product. However, the use of $As_2O_3$ poses health and environmental hazards and requires special handling during the glass manufacturing process.

SUMMARY

According to an embodiment of the present disclosure, a high refractive index glass is provided. The glass has a refractive index greater than or equal to 1.7. The glass includes between about 38 wt. % and about 45 wt. % $SiO_2$, between about 15 wt. % and about 20 wt. % $TiO_2$, between about 6.0 wt. % and about 10 wt. % $ZrO_2$, between about 0.5 wt. % and about 4.0 wt. % $La_2O_3$, between about 0.5 wt. % and about 4.0 wt. % $Nb_2O_5$, between about 12 wt. % and about 19 wt. % BaO, between about 0 wt. % and about 4.0 wt. % SrO, between about 3.0 wt. % and about 8.0 wt. % CaO, between about 0 wt. % and about 3.0 wt. % $Li_2O$, between about 2.0 wt. % and about 6.0 wt. % $Na_2O$, between about 4.0 wt. % and about 8.0 wt. % $K_2O$, between about 0 wt. % and about 3.0 wt. % $Al_2O_3$, between about 0 wt. % and about 3.0 wt. % $B_2O_3$, between about 0 wt. % and about 3.0 wt. % MgO, and between about 0 wt. % and about 3.0 wt. % ZnO. The glass also includes between about 0 wt. % and about 2.0 wt. % of the combination of $Sb_2O_3$+F+Cl+Br; and less than about 0.1 wt. % $As_2O_3$, where the combination of BaO+SrO+CaO is between about 17 wt. % and about 25 wt. %, the combination of $Li_2O$+$Na_2O$+$K_2O$ is between about 6.0 wt. % and about 10.5 wt. %, and the combination of $Al_2O_3$+$B_2O_3$+MgO+ZnO is between about 0 wt. % and about 12 wt. %.

According to another embodiment of the present disclosure, a head mounted wearable device is provided. The head mounted wearable device includes an image forming device and a light guiding device. The light guiding device includes a light guiding member having a high refractive index glass having a refractive index greater than or equal to 1.7, wherein the high refractive index glass has less than about 0.1 wt. % $As_2O_3$.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The disclosure will be understood more clearly from the following description and from the accompanying FIGURE, given purely by way of non-limiting example, in which:

FIG. 1 is a schematic cross-sectional diagram illustrating an exemplary embodiment of a head mounted wearable device including a light guide optical element having a high refractive index glass in accordance with embodiments of the present disclosure.

DETAILED DESCRIPTION

Reference will now be made in detail to the present embodiment(s), an example(s) of which is/are illustrated in the accompanying drawings. Whenever possible, the same reference numerals will be used throughout the drawings to refer to the same or like parts.

The singular forms "a," "an" and "the" include plural referents unless the context clearly dictates otherwise. The endpoints of all ranges reciting the same characteristic are independently combinable and inclusive of the recited endpoint. All references are incorporated herein by reference.

Embodiments of the present disclosure relate to a high refractive index glass essentially free of arsenic ($As_2O_3$), where the refractive index of the glass is greater than or equal to about 1.7. As used herein, the term "essentially free of arsenic ($As_2O_3$)" is meant to refer to weight percentages of arsenic ($As_2O_3$) of less than about 0.1 wt. %. Composition ranges in accordance with the present embodiments are shown in Table I.

TABLE I

| COMPONENT | COMPOSITION (WT. %) |
|---|---|
| $SiO_2$ | 38 to 45 |
| $TiO_2$ | 15 to 20 |
| $ZrO_2$ | 6.0 to 10 |
| $La_2O_3$ | 0.5 to 4.0 |
| $Nb_2O_5$ | 0.5 to 4.0 |
| BaO | 12 to 19 |
| SrO | 0 to 4.0 |
| CaO | 3.0 to 8.0 |
| BaO + SrO + CaO | 17 to 25 |

TABLE I-continued

| COMPONENT | COMPOSITION (WT. %) |
|---|---|
| $Li_2O$ | 0 to 3.0 |
| $Na_2O$ | 2.0 to 6.0 |
| $K_2O$ | 4.0 to 8.0 |
| $Li_2O + Na_2O + K_2O$ | 6.0 to 10.5 |
| $Al_2O_3$ | 0-3.0 |
| $B_2O_3$ | 0-3.0 |
| MgO | 0-3.0 |
| ZnO | 0-3.0 |
| $Al_2O_3 + B_2O_3 + MgO + ZnO$ | 0-12 |
| $As_2O_3$ | <0.1 |
| $Sb_2O_3 + F + Cl + Br$ | 0-2.0 |

As shown in Table I, high refractive index glass in accordance with embodiments of the present disclosure includes between about 15 wt. % and about 20 wt. % $TiO_2$. $TiO_2$ in excess of 20 wt. % may increase the tendency of the glass to devitrify and also may decrease the viscosity of the glass at the liquidus temperature. Additionally, $TiO_2$ in excess of 20 wt. % may also contribute to formation of a yellow coloration in the glass. Embodiments of the present disclosure further include between about 0.5 wt. % and about 4.0 wt. % $La_2O_3$ and between about 0.5 wt. % and about 4.0 wt. % $Nb_2O_5$ which increase the refractive index of the glass. However, $La_2O_3$ in excess of 4.0 wt. % may result in a glass density of above about 3.25. Embodiments of the present disclosure further include between about 6.0 wt. % and about 10 wt. % $ZrO_2$, which provides an effect on the refractive index that it similar to the effect of $La_2O_3$. However, $ZrO_2$ in excess of 10 wt. % may increase the tendency of the glass to devitrify.

High refractive index glass in accordance with embodiments of the present disclosure also includes between about 17 wt. % and about 25 wt. % of a combination of alkaline-earth metal oxides, where the alkaline-earth metal oxides are selected from BaO, CaO and SrO. Amounts of the combination of alkaline-earth metal oxides in excess of 25 wt. % may increase the tendency of the glass to devitrify. The alkaline-earth metal oxides described herein contribute to an increase in refractive index of the glass while having a weak influence on dispersion of the glass.

High refractive index glass in accordance with embodiments of the present disclosure also includes between about 6.0 wt. % and about 10.5 wt. % of a combination of alkali metal oxides, where the alkali metal oxides are selected from $Li_2O$, $Na_2O$ and $K_2O$. Amounts of the combination of alkali metal oxides in excess of 10.5 wt. % may decrease the viscosity of the glass at the liquidus temperature. The alkali metal oxides described herein facilitate melting.

High refractive index glass in accordance with embodiments of the present disclosure may also include a low amount of other oxides, where the other oxides are selected from $Al_2O_3$, $B_2O_3$, MgO, and ZnO. By "low amount of other oxides" it is meant that each of the other oxides is present in an amount less than about 3.0 wt. % and that the combined amount of the other oxides is less than about 12 wt. %. The combined amount of the other oxides may be less than about 1.0 wt. %. Alternatively, the glass may be essentially free of the other oxides. As used herein, the term "essentially free of the other oxides" is meant to refer to weight percentages of the other oxides of less than about 0.1 wt. %. An oxide which is excluded from the discussion above is PbO. Glass in accordance with embodiments of the present disclosure may be essentially free of PbO. As used herein, the term "essentially free of PbO" is meant to refer to weight percentages of PbO of less than about 0.1 wt. %. Preferably, the glass disclosed herein has no PbO.

High refractive index glass in accordance with embodiments of the present disclosure may be a fined glass product where fining is performed with a combination of fining agents. The glass may have less than about 2.0 wt. % of a combination of fining agents, where the fining agents are selected from $Sb_2O_3$, fluorides, chlorides and bromides. Amounts of the combination of fining agents may be less than about 1.0 wt. %. Alternatively, the glass may be essentially free of the fining agents. According to embodiments of the present disclosure, no $As_2O_3$ is purposely used in the fining of the glass. In such cases, the fined glass may still have some $As_2O_3$ as a result of contaminants present in batch materials and/or the equipment used to melt batch materials, but such amounts of $As_2O_3$ are still less than about 0.1 wt. %. However, it is preferable that the glass disclosed herein has no $As_2O_3$.

High refractive index glass as disclosed herein may include other For example, the glass may include less than about 5.0 wt. % $Ba(NO_3)_2$, for example, less than about 3.0 wt. % $Ba(NO_3)_2$. The glass may also include less than about 3.0 wt. % NaF, for example, less than about 1.0 wt. % NaF.

According to embodiments of the present disclosure, the high refractive index glass may further include coloring agents such as, for example, transition metal oxides or rare earth metal oxides.

High refractive index glass as disclosed herein also has high optical transmission. For example, the glass may have a transmission of greater than 97%. The high refractive index glass also has high weathering performance and is resistant to a variety of conditions, including those present in outdoor environments. For example, the glass possesses high resistance to water, acids and alkalis which are each known to cause weathering to certain glass compositions and which could cause the glass to become hazy. High weathering performance is a characteristic that makes the high refractive index glass suitable for use in applications (such as will be described in further detail in relation to FIG. 1 below) where the glass may be exposed to outdoor conditions during use.

The high refractive index glass described herein may be included in various wearable devices. For example, the glass may be incorporated into a head mounted wearable device where the glass serves as a light guide optical element which guides light to at least one eye of the user. In such a configuration, the light guide optical element including high refractive index glass as described herein has a difference in refractive index between the glass and the surrounding environment. As such, the light guide optical element benefits from total internal reflection to direct a light signal from a source to at least one eye of the user. The high refractive index glass of a wearable device as described in accordance with embodiments of the present disclosure may have a refractive index that is greater than or equal to about 1.7. Also, the high refractive index glass of a wearable device as described in accordance with embodiments of the present disclosure may be essentially free of arsenic ($As_2O_3$), or in other terms, may have less than about 0.1 wt. % arsenic ($As_2O_3$).

FIG. 1 is a schematic cross-sectional diagram illustrating an exemplary embodiment of a head mounted wearable device having a light guide optical element including the high refractive index glass described herein. As shown, a display device 100 includes an image forming device 10 and a light guiding device 20. A light signal generated in the image forming device 11 is directed from the image forming device 11 into the light guiding device 20 which includes high refractive index glass. The light signal passes through the light guiding device 20 and exits the light guiding device such that it is incident to at least one eye EY of the user of the head mounted wearable device. As a result, the wearer can recognize the virtual image and the external world image in a superimposed manner.

In the exemplary embodiment shown in FIG. 1, the light guiding device 20 includes a light guiding member 21. The light guiding member 21 of FIG. 1 has a trapezoidal shape, but other shapes and designs are contemplated and the light guiding member is not limited to that shown in FIG. 1. The light guiding member 21 includes a first reflection surface 21a, a second reflection surface 21b, a third reflection surface 21c, and a fourth reflection surface 21d. As a result of the difference in refractive index between the glass material of the light guiding member and the surrounding environment, the reflection surfaces 21a, 21b, 21c and 21d are total reflection surfaces. Alternatively, the fourth reflection surface 21d may include a half mirror layer 28 which has a light reflection property. The half mirror layer 28 may be, for example, a metal reflecting film or a dielectric multilayer coating.

EXAMPLE

Glass having a composition in accordance with embodiments of the present disclosure was formed. The glass had a refractive index of greater than 1.7. The composition of the glass is shown in Table II

TABLE II

| COMPONENT | COMPOSITION (WT. %) |
| --- | --- |
| $SiO_2$ | 40.70 |
| $TiO_2$ | 16.97 |
| $ZrO_2$ | 8.70 |
| $La_2O_3$ | 1.00 |
| $Nb_2O_5$ | 1.365 |
| BaO | 14.30 |
| SrO | 0.50 |
| CaO | 5.20 |
| $Ba(NO_3)_2$ | 2.00 |
| $Na_2O$ | 2.75 |
| $K_2O$ | 5.85 |
| NaF | 0.36 |
| $As_2O_3$ | 0.085 |
| F | 0.22 |

The weathering performance of the high refractive index glass of Table II was examined by testing the hydrolytic resistance, the acid resistance and the alkali resistance of the glass. The glass was determined to correspond to Class 1 of the glasses divided into five hydrolytic classes. The glass was determined to correspond to Class 1 of the glasses divided into four acid classes in accordance with DIN 12116. The glass was determined to correspond to Class 1 of the glasses divided into three alkali classes. As such, the high resistance demonstrated in each of the tests indicates that the glass has good weathering performance and that it would be suitable for use in a wearable device which would preferably be resistant to a variety of environments and conditions.

It will be apparent to those skilled in the art that various modifications and variations can be made without departing from the spirit or scope of the present disclosure.

What is claimed is:

1. A high refractive index glass comprising:
a refractive index greater than or equal to 1.7;
between about 38 wt. % and about 45 wt. % $SiO_2$;
between about 15 wt. % and about 20 wt. % $TiO_2$;
between about 6.0 wt. % and about 10 wt. % $ZrO_2$;
between about 0.5 wt. % and about 4.0 wt. % $La_2O_3$;
between about 0.5 wt. % and about 4.0 wt. % $Nb_2O_5$;
between about 12 wt. % and about 19 wt. % BaO;
between about 0 wt. % and about 4.0 wt. % SrO;
between about 3.0 wt. % and about 8.0 wt. % CaO;
between about 0 wt. % and about 3.0 wt. % $Li_2O$;
between about 2.0 wt. % and about 6.0 wt. % $Na_2O$;
between about 4.0 wt. % and about 8.0 wt. % $K_2O$;
between about 0 wt. % and about 3.0 wt. % $Al_2O_3$;
between about 0 wt. % and about 3.0 wt. % $B_2O_3$;
between about 0 wt. % and about 3.0 wt. % MgO;
between about 0 wt. % and about 3.0 wt. % ZnO;
between about 0 wt. % and about 2.0 wt. % of the combination of $Sb_2O_3$+F+Cl+Br; and
wherein the high refractive index glass is essentially free of $As_2O_3$,
wherein the combination of BaO+SrO+CaO is between about 17 wt. % and about 25 wt. %,
wherein the combination of $Li_2O$+$Na_2O$+$K_2O$ is between about 6.0 wt. % and about 10.5 wt. %, and
wherein the combination of $Al_2O_3$+$B_2O_3$+MgO+ZnO is between about 0 wt. % and about 12 wt. %.

2. The glass of claim 1 comprising:
between about 0 wt. % and about 1.0 wt. % $B_2O_3$;
between about 0 wt. % and about 1.0 wt. % MgO; and
between about 0 wt. % and about 1.0 wt. % ZnO.

3. The glass of claim 1 comprising between about 0 wt. % and about 1.0 wt. % of the combination of $Sb_2O_3$+F+Cl+Br.

4. The glass of claim 1, wherein the glass is essentially free of the combination of $Sb_2O_3$+F+Cl+Br.

5. The glass of claim 1, wherein the combination of $Al_2O_3$+$B_2O_3$+MgO+ZnO is between about 0 wt. % and about 1.0 wt. %.

6. The glass of claim 1, wherein the glass is essentially free of the combination of $Al_2O_3$+$B_2O_3$+MgO+ZnO.

7. The glass of claim 1, wherein the glass further comprises less than 5.0 wt. %. $Ba(NO_3)_2$.

8. The glass of claim 1, wherein the glass further comprises less than 3.0 wt. %. NaF.

9. The glass of claim 1 having a transmission of greater than 97%.

10. A head mounted wearable device comprising:
an image forming device; and
a light guiding device, the light guiding device comprising a light guiding member comprising a high refractive index glass having a refractive index greater than or equal to 1.7, wherein the high refractive index glass is essentially free of $As_2O_3$.

11. The head mounted wearable device of claim 10, wherein the light guiding member comprises at least one total reflection surface.

12. The head mounted wearable device of claim 10, wherein the light guiding member further comprises an element having a light reflection property.

13. The head mounted wearable device of claim 10, wherein light exiting the light guiding device is incident to at least one eye of a user.

14. The head mounted wearable device of claim 10, wherein the high refractive index glass further comprises:
between about 38 wt. % and about 45 wt. % $SiO_2$;
between about 15 wt. % and about 20 wt. % $TiO_2$;
between about 6.0 wt. % and about 10 wt. % $ZrO_2$;
between about 0.5 wt. % and about 4.0 wt. % $La_2O_3$;
between about 0.5 wt. % and about 4.0 wt. % $Nb_2O_5$;
between about 12 wt. % and about 19 wt. % BaO;

between about 0 wt. % and about 4.0 wt. % SrO;
between about 3.0 wt. % and about 8.0 wt. % CaO;
between about 0 wt. % and about 3.0 wt. % $Li_2O$;
between about 2.0 wt. % and about 6.0 wt. % $Na_2O$;
between about 4.0 wt. % and about 8.0 wt. % $K_2O$;
between about 0 wt. % and about 3.0 wt. % $Al_2O_3$;
between about 0 wt. % and about 3.0 wt. % $B_2O_3$;
between about 0 wt. % and about 3.0 wt. % MgO;
between about 0 wt. % and about 3.0 wt. % ZnO; and
between about 0 wt. % and about 2.0 wt. % of the combination of $Sb_2O_3$+F+Cl+Br,
wherein the combination of BaO+SrO+CaO is between about 17 wt. % and about 25 wt. %,
wherein the combination of $Li_2O$+$Na_2O$+$K_2O$ is between about 6.0 wt. % and about 10.5 wt. %, and
wherein the combination of $Al_2O_3$+$B_2O_3$+MgO+ZnO is between about 0 wt. % and about 12 wt. %.

15. The head mounted wearable device of claim 11, wherein the high refractive index glass comprises:
between about 0 wt. % and about 1.0 wt. % $B_2O_3$;
between about 0 wt. % and about 1.0 wt. % MgO; and
between about 0 wt. % and about 1.0 wt. % ZnO.

16. The head mounted wearable device of claim 11, wherein the high refractive index glass comprises between about 0 wt. % and about 1.0 wt. % of the combination of $Sb_2O_3$+F+Cl+Br.

17. The head mounted wearable device of claim 11, wherein the high refractive index glass is essentially free of the combination of $Sb_2O_3$+F+Cl+Br.

18. The head mounted wearable device of claim 11, wherein the high refractive index glass comprises a combination of $Al_2O_3$+$B_2O_3$+MgO+ZnO is between about 0 wt. % and about 1.0 wt. %.

19. The head mounted wearable device of claim 11, wherein the high refractive index glass is essentially free of the combination of $Al_2O_3$+$B_2O_3$+MgO+ZnO.

20. The head mounted wearable device of claim 11, wherein the high refractive index glass has a transmission of greater than 97%.

* * * * *